: 2,797,146
Patented June 25, 1957

2,797,146

MIXING APPARATUS AND PROCESS UTILIZING SAME

Robert B. Schow and Robert H. Coleman, Ashtabula, Ohio, assignors to National Distillers and Chemical Corporation, New York, N. Y., a corporation of Virginia No Drawing. Application August 8, 1955, Serial No. 527,421

3 Claims. (Cl. 23—184)

The present invention relates to an improvement in processing, and apparatus useful therefor, of mixtures of sodium and sodium peroxide and, more particularly, to an improvement in processing of mixtures of sodium and sodium peroxide under reaction conditions for production of sodium monoxide.

Illustrative of processes wherein reaction of sodium with sodium peroxide is employed are those wherein the reaction is carried out under conditions to produce sodium monoxide, and, if desired, subsequent conversion of the monoxide to sodium peroxide. For example, in the production of sodium peroxide from elemental sodium, (1) elemental sodium and sodium peroxide may be mixed in an inert atmosphere at a temperature above the melting point of sodium and below the temperature at which any substantial reaction occurs between sodium and sodium peroxide, (2) the mixture of sodium and sodium peroxide may then be subjected to a temperature at which the sodium reacts with the sodium peroxide to form sodium monoxide, and (3) the sodium monoxide-sodium peroxide mixture may then be converted to sodium peroxide in an oxidizing atmosphere. A more specific illustration of such a process is set forth in U. S. Patent No. 2,685,500, issued August 3, 1954, to Hulse et al. In such an operation, and with respect to step (2) which is herein designated as the "reducing step," the reaction between sodium and sodium peroxide to form sodium monoxide is carried out at an elevated temperature, e. g., from about 205 to about 425° C. and preferably, from about 260 to about 400° C., while the reacting mixture is maintained under agitation, such as under intimate mixing conditions. For such a purpose, the reaction may be carried out in any of many types of mixing apparatus but, preferably, in mixing apparatus having moving parts to effect the mixing and which parts are exposed to both reducing and oxidizing environments while in contact with the reacting mixture in its conversion to sodium monoxide. In a specific illustration, the reaction may be carried out in a vessel, such as a horizontal pug mill, equipped with a rotating shaft to which are attached paddle blades to provide effective mixing of the reacting mixture. In the use of such apparatus for carrying out the aforesaid reaction, difficulties are encountered in that the moving parts of the apparatus exposed to contact with the reacting mixture, are subjected to both an oxidizing and reducing environment and to the abrasive action of the sodium peroxide whereby rapid corrosion occurs to the extent that frequent shutdowns are necessary for replacement or reconditioning of corroded parts by building up the corroded parts, particularly the paddle blades, with welding rod. Obviously, such shutdowns not only entail loss of production during the shutdown period, but induce an additional expense as a result of the need to clean out the apparatus during each shutdown, and the labor involved in replacement and/or reconditioning of the corroded parts. Moreover, in between the time when corrosion of the mixing apparatus starts and the time it has progressed to the point of required shutdown, the operation is seriously impaired due to the loss of mixing efficiency as, without adequate mixing in the reducing step, desired reduction does not occur which results in burning and production of fines in treatment of material from the reduction step for production of sodium peroxide. In endeavors to extend the continuity of the operation by minimization of frequency of such shutdown requirements, resort has been made to use of many different types of metals for moving parts of the apparatus in contact with the mixture undergoing reaction. For example in the use of a pug mill of the horizontal type equipped with a rotary shaft to which blades are attached, metals set forth hereinafter have been utilized for the paddles per se or as mountings for the leading edges of the paddles but, in all cases, the life of the paddles did not exceed about six weeks and, in most cases, the life of the paddles was materially less. Such metals have included mild steels, white cast iron, nickel, Ni-hard, chromium carbide, titanium carbides, silver plated nickel, tungsten carbide, and titanium; and self-hardening welding rod materials such as studite, Stellite, chromalloy, Airco E6010, Airco 916, and No. 132 Inconel.

The present invention is based on the discovery that a marked and unexpected improvement in the life of equipment, exposed to contact with a mixture of sodium and sodium peroxide at an elevated temperature, is effected by use of equipment comprising zirconium metal. For example, and using for illustration an apparatus of the pug mill type for carrying out the reaction of sodium with sodium peroxide under conditions to form sodium monoxide, markedly improved results are obtained by use of mixing paddles comprised of zirconium, by use of paddles of mild steel, nickel, etc. that have their leading edges tipped with zirconium, and the like. By such use of zirconium, particularly for the moving parts of mixing apparatus subjected to the oxidizing, reducing and abrasive environment in the described reaction of sodium and sodium peroxide, the life of the equipment is so markedly extended that a substantial improvement is provided in carrying out the aforesaid process in that the frequency of required shutdowns is reduced to an unexpected degree and substantial economies effected as a result thereof.

In order to further describe the invention, but without intent of limitation, the following embodiment is set forth.

A horizontal pug mill reducer having a rotary shaft to which short, stubby paddles were attached was used for carrying out reaction of a mixture of sodium and sodium peroxide at 260° to 425° C. under conditions for formation of sodium monoxide. By use of paddles composed of mild steel, nickel, or of other metals or alloys set forth hereinbefore, as well as paddles of mild steel, nickel, etc., having their leading edges tipped with metals and alloys as enumerated hereinbefore, the maximum life of the paddles did not in any case exceed an average of five to six weeks and, in most cases, substantially less. However, by use of zirconium, such as by fastening zirconium bar stock (½" x ½") with machine screws to the leading edge of the paddles (nickel, mild steel, etc.) the life of the paddles was extended to a period of at least twenty-six weeks i. e., an increase of about five to about six fold as compared to the paddle life obtained under comparable operating conditions from corresponding paddles but without the zirconium protective tips.

It should be apparent that the unexpected improvement provided by use of zirconium as embodied herein results in many advantages in carrying out the described processing of sodium and sodium peroxide for production of sodium monoxide in that the frequency of costly shutdowns due to failure of the mixing apparatus are obviated, and maintenance costs and other expense attendant to shutdowns are materially reduced whereby the commercial feasibility of the described process is materially improved.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. In a process wherein a mixture comprising sodium and sodium peroxide is reacted under conditions to produce sodium monoxide and the reacting mixture is maintained under agitation during said reaction by mixing means which contacts the reacting mixture, the improvement which comprises the use of such mixing means consisting essentially of zirconium metal.

2. In a process wherein a mixture comprising sodium and sodium peroxide is reacted under conditions to produce sodium monoxide and the reacting mixture is maintained under agitation during said reaction by mixing means having moving metal parts in contact with the reacting mixture, the improvement which comprises the use of such moving parts consisting essentially of zirconium metal.

3. In a process wherein a mixture comprising sodium and sodium peroxide is reacted under conditions to produce sodium monoxide and the reacting mixture is maintained under agitation during said reaction by mixing means of the paddle type in contact with the reacting mixture, the improvement which comprises use of such paddle means having leading edges of zirconium metal.

References Cited in the file of this patent

UNITED STATES PATENTS

| | | |
|---|---|---|
| 2,109,119 | Naumann | Feb. 22, 1938 |
| 2,685,500 | Hulse et al. | Aug. 3, 1954 |

OTHER REFERENCES

Uhlig's "Corrosion Handbook," 1948 ed., pages 347, 348, John Wiley and Sons, Inc., N. Y.